March 21, 1950     R. O. BELL     2,501,255
TREE SUPPORT
Filed May 6, 1946     2 Sheets-Sheet 1
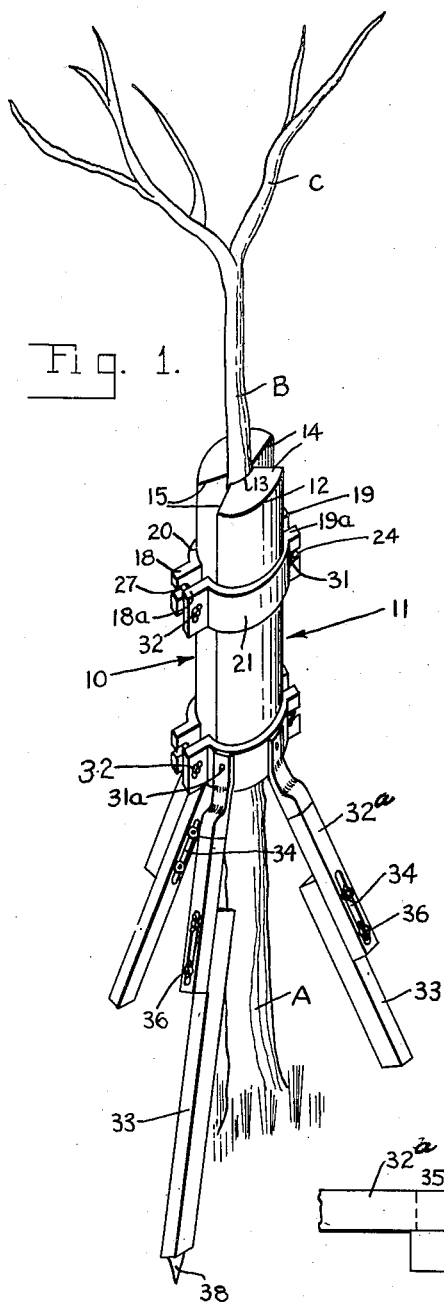
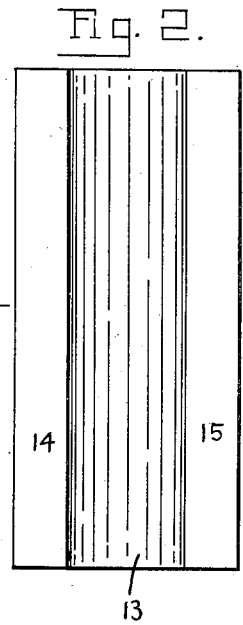
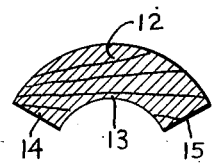
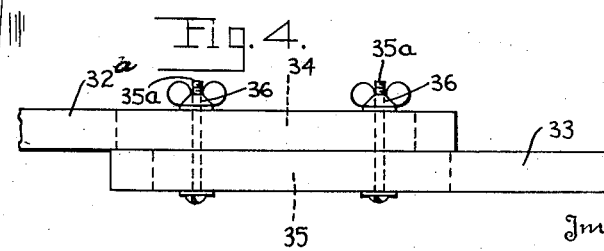
Inventor
RUSSELL O. BELL
By Kimmel & Crowell
Attorneys March 21, 1950 R. O. BELL 2,501,255
TREE SUPPORT
Filed May 6, 1946 2 Sheets-Sheet 2
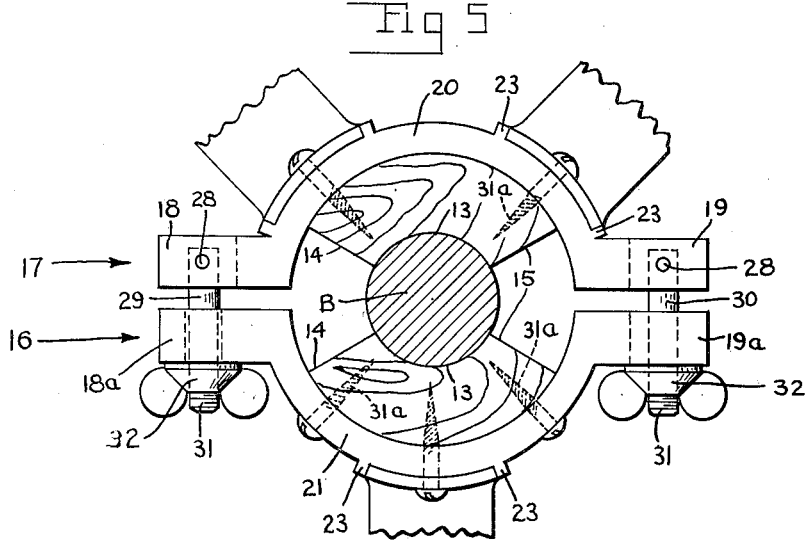
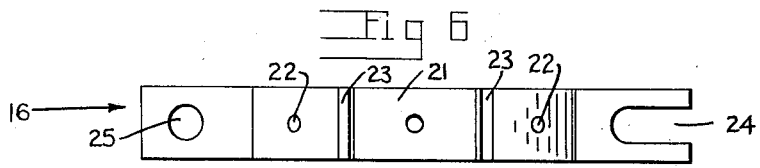
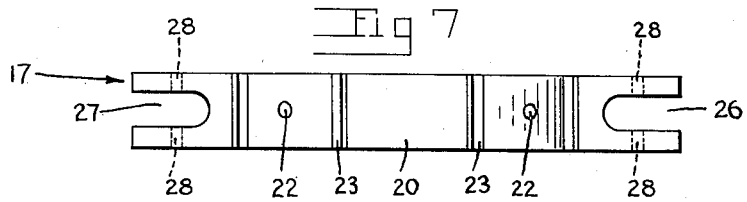
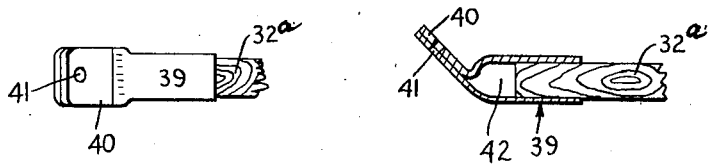
Inventor
RUSSELL O. BELL
By Kimmel & Crowell
Attorneys Patented Mar. 21, 1950

2,501,255

UNITED STATES PATENT OFFICE 2,501,255

TREE SUPPORT

Russell O. Bell, Lynwood, Calif.

Application May 6, 1946, Serial No. 667,576

1 Claim. (Cl. 248—44)

The present invention relates to improvements in a device employed in the correction of deformities in trees and particularly in the trunks of trees and similar plants.

One of the objects thereof is to provide a simple, efficient and inexpensive jacket for girding the trunk of a tree which is bowed, bent or irregularly shaped and which it is desired to correct for unretarded growth.

Another object thereof is to provide a means of applying a splinter to the deformed, mis-shapen trunk of a tree which would ordinarily otherwise interfere with its healthy growth and proper development.

A further object thereof is to provide a sectional jacket for the trunk of a tree which can be adjustably applied along any part of the length of its trunk, especially upon a portion thereof that is not growing straight.

A further object thereof is to provide a removable jacket or attachment to a tree trunk at the time it shows signs of leaning over or developing any other abnormal deformity, for the purpose of encasing the affected portion of the tree trunk in a straightening out fitting, which will gradually restore the mis-shapen part to normality.

A still further object thereof is to provide tripod means of anchoring the tree jacket at the base of the tree into the ground for reinforcing its under support upon the tree adjustably.

Another object thereof is to provide a type of tree enclosing jacket for tree straightening out purposes which has novel provision for opening and closing itself around a tree.

A further object thereof is to provide, in a device of the character described, means for encasing a young tree showing indications of retarded, abnormal growth by way of mis-shapen trunk; in such a manner that the affected part thereof may be frictionally urged to assume progressively a straight disposition.

With the above and other objects in view my invention consists in the arrangement, combination and details of construction disclosed in the drawings and specification, and then more particularly pointed out in the appended claim.

In the drawings, wherein similar reference characters designate similar parts throughout the respective views—

Figure 1 is a perspective view showing my invention applied upon a tree,

Figure 2 is a plan view of one of the splinter sections,

Figure 3 is an end view of the splinter section,

Figure 4 is a fragmentary plan view of one of the adjustable anchoring lugs,

Figure 5 is a fragmentary view showing in top plan my invention applied to a tree, Figure 6 is a side elevation of one of the jacket clamping members, Figure 7 is a side elevation of the other of the jacket clamping members, Figure 8 is a plan view of a socket member, and Figure 9 is a longitudinal section of the socket member.

In arboriculture it often happens that some trees, especially the young trees, develop indications of stunted growth by exhibiting mis-shapen or faulty trunks. This abnormality takes on different forms, but in most cases the trunk is bent, leans over so as to dangerously distribute the weight of the limbs thereof, or otherwise is formed crooked or with portions that do not shoot straight up from the ground. Correction of such abnormal defects is the purpose of this invention. In order to insure the growing tree to a straightening out process, I enclose the affected portion thereof within a jacket made up of two oppositely arranged splinter sections designated broadly 10 and 11.

The splinter sections are made elongated out of any desired material, preferably of wood. They are made of the same size for interchangeable use. Each splinter section or member has an outer convex surface and an inner concave surface, the former being designated 12 and the latter 13. This gives to the splinter section a sector-shaped or segmental configuration. The angle of radial pitch of the splinter section may vary for the purpose of enlarging or deepening the concavity in one side thereof, which is the side that is to overlie the trunk of a tree.

It will be seen that the opposing edges of each segmental splinter member converge towards the concave inner surface 13 thereof, so that when the splinter members enclose a tree in jacket-like manner, these edges flare outwardly from diametrically opposite points of the tree as is illustrated in Figure 1.

A means of clamping the splinter members 10 and 11 so as to crowd same against opposite sides of a tree trunk is shown. Various means may be resorted to for this purpose. That shown suggests the use of sectional clamping bands. These sections are generally denoted 16 and 17 in Figure 5. They are alike in matters of form and shape and size.

Each clamping band section consists of the segmental central band portion 20 and 21 respectively, joined integrally and terminally by diametrically opposite aligning straight lugs 18, 19, and 18a, 19a respectively. One of the band sections 17 has slots formed in them, as at 26, 27, which open out terminally. The other band section 16 has only one slot 24 opening out terminally of one lug. The other lug is formed with an opening or hole 25.

A pair of screw bolts are employed, designated 31 as a means of connecting together the ends of the band sections 16 and 17, and the inner ends of bolts 29, 30 are extended into the slots 26, 27 of the member 17, and pivotedly secured therein. The outer ends of the bolts are respectively engaged with the lugs of the other band section 16. One bolt 31 has its outer end extending through the hole 25 of band section 16, while the other bolt 31 has its outer end swivellably extended laterally into the slot 24 of band section 16. Wing nuts 32 are threaded upon the outer ends of the bolts 31.

In many cases clamping the jacket directly upon the trunk of the tree will effect the straightening out thereof in the course of time. But in the case of weak or young trees of slender trunk cross section, the added weight and surface of the jacket would increase the hazard of breakage where a strong wind shakes the tree. For this and other reasons it may be found desirable or necessary to anchor the jacket into the ground for the purpose of holding it in rigid, reinforced relation thereto so the tree does not sway unreasonably, if at all. For this purpose anchoring means is employed now to be described.

A tripod or similar device is made use of. In this event each band portion 20, 21 of each clamping band section may be formed with pairs of separated transversely disposed ridges or ears 23 upon the convex surface thereof. Use is also made of adjustable stakes. Each adjustable stake consists of two bar-like members made of any suitable stout or strong material desired. The two bars composing each stake are denoted at 32a, 33. Bar 32a is formed with an elongated slot 34, and likewise bar 33 is formed with an elongated slot 35. Screw bolts 35a are inserted into the slots 34, 35 of bars 32a, 33 and wing nuts 36 are threaded upon the bolts 35a as shown in Figure 4.

Socket members are also used. They are made and shaped out of metal. These metal socket members are designated 39 and receive with a press fit the inner ends of bars 32a. The outer or terminal portions of the socket members 39 are mashed into flattened portions 40 disposed preferably at an obtuse angle with respect to the axis of these socket members, as illustrated in Figure 9. Holes 41 are formed in these flat terminals 40 of the socket members.

The flat terminals 40 of the socket members are placed in overlying contact with the convex bands 21, 20 of the clamping members, so as to extend between the ridges or ears 23 thereof. They are secured to the band formation by fasteners or screws 31a.

The use and operation of the invention is as follows: Where it is not necessary to employ the anchoring tripod, the jacket alone is applied to the trunk of the deformed tree. Usually there is a bend in the tree trunk so that one portion of the tree trunk is out of line with the other. The two splinter members 10 and 11 are taken and placed on opposite sides of the trunk of the tree so as to overlie the bowed or curved portion of the trunk. This forms a jacket by encasing the tree trunk so it seats in and between the concave surfaces 13 of the two splinter members, which action separates the end edges 14, 15 from one another so they flare outwardly radially of the tree trunk.

The separate sections 16 and 17 of the clamping members are then taken, each complemental pair in turn, and girdled around the convex surfaces 12 of the splinter members so as to encase parts of the sectional jacket therein and therebetween.

In properly applying the clamping band sections 16, 17 about the tree, they are joined together in one of two ways. One way they are a hinged unit so that both sections are applied together. The other way the sections must be separately applied. My invention may be assembled in either way.

Where conditions permit, the hinged assembly is used. In this case, wing nut 32 is tightly threaded onto bolt 31 which protrudes through hole 25 of section 16. This hinges together the lugs 18, 18a at one end of the two sections 16, 17 so one section may swing upon the other so as to open and close upon the same as well as allow the splinter sections to be encased when the sections are in closed relation. The other wing nut 32 is then used. For this purpose the other bolt 30 is swung upon its pivot 28 and made to enter slot 24 of section 16, and then the wing nut 32 is tightly threaded onto this bolt. By screwing home this wing nut the two sections 16, 17 are crowded against the splinter members 10, 11, and in turn the latter bind against the tree trunk. As pressure is imposed by the splinter members against opposite sides of the tree trunk thus encased, a straightening out procedure is inaugurated. In the course of time the tree thus jacketed will have its deformity corrected and will be straightened out. At this time the jacket can be removed.

However, if the two sections 16, 17 are not hinged together before they are applied against a tree, the procedure of application calls for first mounting section 16 against the splinter section it holds against the tree overlappingly with respect to the splinter member, while one wing nut 32 is absent from one bolt 29. The other section 17 is then similarly applied against the other splinter member which overlies the tree properly. In doing this, bolt 29 is inserted into hole 25 of section 16, and bolt 30 is swung into slot 24 of that section. The wing nuts 32 are then threaded onto the outer ends of both bolts 31 and the two sections are drawn together to crowd the splinter sections against the trees.

In sections where strong head winds prevail, and the trees are slender in development, mounting a jacket alone upon the deformed trunk of the tree will not produce desirable results. It is necessary to reinforce the jacket on the tree by anchoring it into the ground to provide a more rigid support. The tripod shown allows this to be done. The points 38, which are optionally provided upon the stakes are caused to penetrate the ground around the base of the tree upon which that type of jacket has previously been applied where the stakes depend divergingly therefrom. This has already been explained.

By virtue of the fact that the flat terminals 40 of the socket members (located at the upper end of the stake 32a) dispose the stakes in downwardly spread out relation and are secured to one set of clamping members 16, 17 already set forth, when they are anchored upon the ground, these stakes form a rigid undersupport for the jacket and splinter members comprising same. By loosening the wing nuts 36 on the bolts 35a that engage in the slots of these stake bars, the length of the stakes may be varied adjustably by sliding one bar upon the other accordingly. The wing nuts are then again threaded tightly on the bolts to hold the bars clamped in adjusted relation.

From the foregoing it will be seen that the tripod carrying clamping members are themselves secured rigidly to the splinter members 10 and 11 by screws or like fasteners 31a, shown in Figure 5. Two stakes are thus secured to one section, and the third to the other section. If now these clamping members or sections are hinged together and connected as shown in the left end of Figure 5, the entire arrangement forms a complete carrying unit. In this unit, clamping sections 16, 17, the splinter sections 10, 11 and parts of the tripod are formed in two oppositely arranged parts, hinged together so these parts may open and close one upon the other. Instead of the bolt and wing nut hinge, any other kind of hinge may be employed as may be found desirable.

I do not mean to confine myself to the exact details of construction herein disclosed but cover all variations thereof set forth in the appended claim.

What I desire to claim and secure by patent is:

A tree splint comprising a pair of arcuate semicircular clamping members, a radial ear on the ends of each of said members, the ears of one of said members formed with radially disposed outwardly opening slots, bolts rockably carried by the ears of the other member slidably engageable in said slots, means on said bolts for clamping said members together, a segmental arcuate splint member of an arc less than said clamping members fixedly carried by each of said clamping members engageable about the trunk of the tree, a pair of downwardly and outwardly inclined supporting legs on one of said clamping members and an outwardly and downwardly inclined leg on the other of said clamping members constituting a tripod for supporting said splint on a tree.

RUSSELL O. BELL.

REFERENCES CITED

The following references are of record in the file of this patent:

UNITED STATES PATENTS

| Number | Name | Date |
|---|---|---|
| 774,497 | Rompel | Nov. 8, 1904 |
| 1,116,961 | Weixler | Nov. 10, 1914 |
| 1,117,158 | Bernartz | Nov. 17, 1914 |
| 1,560,404 | Brown | Nov. 3, 1925 |
| 1,680,050 | Keppens | Aug. 7, 1928 |
| 1,849,303 | Labow | Mar. 15, 1932 |